(12) United States Patent
Merchez (10) Patent No.: US 11,420,206 B2
(45) Date of Patent: Aug. 23, 2022

(54) MEASURING CUVETTE FOR COUNTING AND/OR CHARACTERIZING CELLS

(71) Applicant: DIAGDEV, Castries (FR)

(72) Inventor: Benoit Merchez, Combaillaux (FR)

(73) Assignee: DIAGDEV, Castries (FR)

( * ) Notice: Subject to any disclaimer, the term of this patent is extended or adjusted under 35 U.S.C. 154(b) by 212 days.

(21) Appl. No.: 16/627,002

(22) PCT Filed: Jun. 28, 2018

(86) PCT No.: PCT/FR2018/051605
§ 371 (c)(1),
(2) Date: Dec. 27, 2019

(87) PCT Pub. No.: WO2019/002787
PCT Pub. Date: Jan. 3, 2019

(65) Prior Publication Data
US 2020/0222900 A1 Jul. 16, 2020

(30) Foreign Application Priority Data
Jun. 28, 2017 (FR) ...................................... 17 55974

(51) Int. Cl.
*B01L 3/00* (2006.01)

(52) U.S. Cl.
CPC ..... *B01L 3/50825* (2013.01); *B01L 2300/041* (2013.01); *B01L 2300/0832* (2013.01); *B01L 2300/168* (2013.01)

(58) Field of Classification Search
CPC ........... B01L 3/50825; B01L 2300/041; B01L 2300/0832; B01L 2300/168;
(Continued)

(56) References Cited

U.S. PATENT DOCUMENTS

| 4,168,294 A * | 9/1979 | Calzi ...................... G01N 33/49 |
| | | 422/562 |
| 4,673,289 A | 6/1987 | Gaucher |
| 5,138,181 A | 8/1992 | Lefevre et al. |
| 2006/0038998 A1* | 2/2006 | Wagner .................. G01N 21/51 |
| | | 356/336 |

(Continued)

FOREIGN PATENT DOCUMENTS

| FR | 2 653 885 A1 | 5/1991 |
| FR | 2 956 207 A1 | 8/2011 |

(Continued)

OTHER PUBLICATIONS https://www.merriam-webster.com/dictionary/frustoconical (Year: 2022) and https://www.merriam-webster.com/dictionary/frustum (Year: 2022).*

(Continued)

*Primary Examiner* — Benjamin R Whatley
*Assistant Examiner* — Jacqueline Brazin
(74) *Attorney, Agent, or Firm* — Maier & Maier, PLLC (57) ABSTRACT

A measuring cuvette for counting and/or characterizing cells, the measuring cuvette including a base and a transparent lateral enclosure extending from the base so as to form with the latter an optical measurement chamber; the base having a through-orifice with a diameter of 30 to 100 μm for cells to pass through, characterized in that the base and the transparent lateral enclosure form a one-piece cuvette suitable both for impedance measurement and for optical measurement. Also, a system for characterizing cells, which includes the measuring cuvette.

12 Claims, 5 Drawing Sheets

(58) Field of Classification Search
CPC ........... G01N 2015/1006; G01N 15/10; G01N 15/12; G01N 21/05; G01N 15/1459; G01N 2015/1037; G01N 15/1436
USPC ........................................................ 422/568
See application file for complete search history.

(56) References Cited

U.S. PATENT DOCUMENTS

2010/0290041 A1* 11/2010 Graham ................. C03B 23/04
356/246
2012/0097582 A1 4/2012 Tsukii et al.

FOREIGN PATENT DOCUMENTS

| FR | 3 022 998 A1 | 1/2016 | | |
|---|---|---|---|---|
| JP | 6113139 A | 1/1986 | | |
| JP | 11281564 A | 10/1999 | | |
| JP | 2005221327 A | 8/2005 | | |
| JP | 2014215041 A | 11/2014 | | |
| JP | 2020522792 A | 7/2020 | | |
| WO | 2011077765 A1 | 6/2011 | | |
| WO | WO-2016081168 A1 * | 5/2016 | ......... | G01N 15/1459 |

OTHER PUBLICATIONS

International Search Report dated Oct. 16, 2018 in corresponding International application No. PCT/FR2018/051605; 4 pages.
Office Action dated Mar. 2, 2022, in connection with corresponding Chinese Application No. 201880043231.7 (12 pp., including machine-generated English translation).
Office Action dated Feb. 7, 2022, in connection with corresponding Japanese Application No. 2020-522792 (8 pp., including machine-generated English translation).

* cited by examiner

MEASURING CUVETTE FOR COUNTING AND/OR CHARACTERIZING CELLS

FIELD

The present invention relates to the technical field of flow cytometry, particularly flow cytometry accessories such as measurement cuvettes and supports for such measurement cuvettes.

Background

Nowadays, flow cytometry makes it possible to determine cell characteristics and properties, for example the sizes, intracellular contents, DNA contents thereof, etc. It also makes it possible to study the variation and distribution of these characteristics within a cell population, ultimately resulting in the identification of subpopulations among the cells, such as for example the differentiation of various cells making up blood.

Moreover, flow cytometry is a rapid method. Typically, several thousands of cells per minute are characterised. Thus, it enables the enumeration and characterisation of rare cell subpopulations. The rarity of these subpopulations does not generally enable their observation and characterisation by microscopy, particularly due to the impossibility of obtaining a number of measurements made on these subpopulations which is statistically acceptable.

Furthermore, due to the improvement of optical sensors in recent years and particularly their ability to detect increasingly lower intensity signals, it is possible both to measure the volume of a cell and obtain information on its cell content by means of, on one hand, an impedance measurement and, on the other, an optical measurement.

Flow cytometry essentially consists of passing cells individually in a liquid stream of large cross-section relative to the size of the cells. This liquid stream ends with a nozzle having an orifice sized to prevent the simultaneous or overly close passage over time of two or a plurality of cells. The flow rate being constant between the liquid stream and the orifice, the velocity of the cells increases azs the diameter of the liquid stream decreases and at the exit of the nozzle, the cells attain velocities of the order of several thousand per second in a liquid jet having the diameter of the nozzle.

The measurement of the volume of the cells is carried out by measuring the impedance on either side of the nozzle orifice. Indeed, the volume of a cell is correlated with a variation of impedance induced by the passage of the cell in a conductive medium (Coulter system), the cell being considered as being electrically insulating. The volume is determined absolutely, regardless of the shape of the cell.

Moreover, the passage of the cells through the nozzle orifice provides a certain hydrodynamic centring of the cells and also their orientation. Thus, it is possible to accurately position the jet outflowing from the nozzle and containing the cells in a light beam emitted by an excitation source. When a cell traverses the light beam, it diffuses a certain number of optical signals suitable for use by the cytometer in order to determine the properties of the cell. These optical signals comprise:

light reflection on the cell, due to the difference in indices between the liquid and the cell, but also between the different components of the cell, expressed by the reflection of a portion of an incident light ray;
light refraction on the cell expressed by a deviation of the light ray entering the cell; and
light diffraction on the cell, essentially under a solid angle ranging from a few degrees to a solid angle of 360°.

All these signals are collected by an optical collection system, then separated according to their wavelength (mid-height width between 20 and 50 nm, or 30 to 40 nm) by a system of optical filters and finally reach various light sensors. These various sensors may be suitable for:

measuring the forward scatter of the cell;
measuring the side scatter of the cell;
measuring the absorbance of the cell; and
measuring the fluorescence of the cell.

Forward scatter is due to the scatter of a portion of the incident light arriving on the surface of the cell membrane by the latter. The portion of scattered light has the same wavelength as the incident light. It is sensed along the axis of the incident light. It provides information on the size and mean refractive index of the cell.

Side scatter is due to the scatter in all spatial directions of the portion of the incident light that has gone through the cell membrane by the intracellular organelles. It can be sensed by a photomultiplier or an avalanche photodiode. Bringing into play the refraction and reflection properties, it provides information on the fine heterogeneity of the cell contents.

Absorbance requires a stable excitation source. It is proportional to the diameter of the cell and to the absorption index of the intracellular organelles.

In the case where the cell is labelled with one or a plurality of fluorochromes, the fluorochromes emit, during their excitation, fluorescent light at one or a plurality of wavelengths greater than that of the excitation source in all spatial directions. Interference filters enable the separation of the various fluorescence wavelengths (generally into mid-height width spectra of 20 to 50 nm, or 30 to 40 nm), each sent to a photomultiplier. The intensity of the fluorescence measured is dependent on the number of fluorochrome molecules bound to the cell. For example, in the case of the use of the DRACQ 5 marker which is a fluorochrome passively traversing the cytoplasmic membrane of the cells and binding specifically with the DNA, it is possible to extract information on nucleated cells. The DRACQ 5 marker has two absorption peaks at 622 nm and 676 nm and two others in the ultraviolet range at 240 nm and 314 nm. It emits fluorescence in the red range with wavelengths between 665 nm and 800 nm. The filter generally used is a dichroic type filter which reflects at 90° of the incident beam all the spectral components lower than 650 nm and transmits spectral components greater than 650 nm. Given the definition of the light source, the first filter is naturally centred at the wavelength of the light source with a bandwidth of the order of 50 nm. Thus, in this set-up, it is possible to measure for each particle three physical quantities: an electrical measurement representative of the volume of the particle, an extinction measurement associated with the refringence of the cell, and finally a fluorescence measurement associated with the nucleic acid content of the analysed cell.

Flow cytometry is advantageously used for haematology study enabling diagnosis and therapeutic monitoring of various viruses, infections and parasites, as well as the functional study of healthy cells. Thanks to flow cytometry, it is possible to count and characterise the different types of blood cells.

For example, flow cytometry applied to leukocytes makes it possible to ascertain their total number and differentiate them according to their morphology and classify them into three different types by means of an impedance measurement of the cell volume and an absorption measurement.

A first type is that of monocytes which are large cells (20 to 40 µm in diameter). The shape of their nucleus may be round, oval, reniform or downright irregular; the most frequent case being the reniform shape. Their chromatin is low in density, non-lumpy, and of regular structure. The residence time of monocytes in blood is 2 days before their tissue passage and the medullary transit time is 1 to 2 days. When they are activated, they become macrophages. They are capable of phagocyting bacteria, whole cells as well as various so-called pollutant particles, such as for example dust.

A second type is that of lymphocytes which play a major role in the immune system. They can be separated into two groups of different sizes:

small-sized lymphocytes (7 to 9 µm in diameter) which have a nucleus of rounded or oval shape, sometimes reniform with a non-extensive, light or slightly basophilic cytoplasm, generally extending on a single side of the nucleus; and larger-sized lymphocytes (9 to 15 µm in diameter) which have a centred or slightly off-centred nucleus with a more extensive cytoplasm than that of the small-sized lymphocytes and completely surrounding the nucleus.

A third type, that of granulocytes also known as polynuclear cells, the main function whereof being protection against infections, may be differentiated into three subcategories.

Firstly, neutrophils are the most plentiful granulocytes (about 96%). They are of rounded shape and have a diameter of 12 to 14 µm. They are characterised by the multilobed shape of their nucleus (from 3 to 5 lobes). They have a residence time in blood of 2 days before their tissue passage and a medullary transit time of granular precursors of 10 to 14 days. There exists of a medullary reserve compartment of neutrophils. They are very effective in killing bacteria and are predominant during acute type inflammations. Their essential role is to defend the body against foreign microorganisms, such as bacteria and yeasts. Their excretory functions promote local inflammatory tissue reactions and contribute to the defence thereof.

Next, basophils are very scarce and make up merely about 0.5% of leukocytes. They have a diameter of 10 to 14 µm. Their bilobed nucleus is masked by specific granulations which are relatively numerous and dispersed throughout the cell. Their residence time in blood is 12 to 24 hours, with no known tissue passage. The medullary transit time would be identical to that of the neutrophils. An important function of basophils is to attract eosinophils.

Finally, eosinophils make up about 2 to 5% of circulating leukocytes (350 elements per cubic millimetre approximately). These are cells from 12 to 14 µm in diameter characterised by a bilobed nucleus and above all by the appearance of the granulations which are spherical (0.5 to 1.5 µm in diameter). They contain azurophilic granules. Eosinophilic polynuclear cells are key cells in allergic inflammation and antiparasitic defence. Their distribution is above all tissular, the circulating fraction merely making up 1% of the total number of eosinophils. Their transit time in blood is from 3 to 8 hours after exiting the bone marrow and until their deposition in tissues (particularly the intestines, lungs, skin and uterus) where they will have a lifetime of some ten days.

In a further example, it is possible to determine the total number of erythrocytes and platelets, differentiate them according to their morphology and classify them by means of an impedance measurement of the cell volume and an absorption measurement.

Further applications of flow cytometry exhibit an obvious diagnostic interest due to the characterisation and/or enumeration of the different types of blood cells such as reticulocytes, erythroblasts, immature cells and leukocyte precursor cells, activated lymphocytes or still cross-linked platelets.

The impedance measurement of the volume of a cell uses a device comprising a cuvette wherein the base has an orifice, the diameter of about 50 µm of which enables the individual passage of a cell in a liquid flow. Upstream from the orifice, the liquid flow is formed from a sample jet comprising the cells to be characterised and a sheath jet (generally saline water) surrounding the sample jet thus enabling hydrofocussing of the sample jet. The terminals of a voltmeter are connected electrically to electrodes, one of which is disposed upstream from the orifice and the other downstream, O-rings being required to ensure tightness at these levels. The voltage variation observed at the time of the passage of a cell is representative of its volume.

The base of the cuvette is generally manufactured from a disk of a few millimetres in diameter and a few microns in thickness made of precious stones such as very costly synthetic ruby. The through-orifice is machined in this disk, then the disk is crimped manually on the end of a nozzle. The crimping operation is not without risks as microcracks may appear thus creating a modification of the resistivity between the positive and negative electrodes thus distorting the impedance measurement.

With regard to optical measurements, the latter use a further device comprising a cuvette formed of a flat base having at its centre an orifice, the diameter of 80 µm of which enables the individual passage of a cell in a liquid flow and of a transparent enclosure pressed against the base. Between the enclosure and the base, a seal ensures the tightness between these two parts. A secondary sheath input at the lower part of the enclosure in the immediate vicinity of the base enables the arrival of a sheath jet for sheathing the sample flow in order to accompany it over a length of 400 µm where the sample flow intersects a light beam emitted by the excitation source. A second seal is required to ensure the tightness on the upper part of the cuvette.

In order to carry out the volume measurement and optical measurements at the same time, it is possible to combine the two devices into a single device using the base of the volume measurement device as a base for the optical measurement device. However, such an arrangement requires the use of four seals. Moreover, the lack of leaks between the various elements cannot be guaranteed.

SUMMARY

One aim of the present invention is to remedy at least one of the drawbacks of the prior art.

To this aim, the invention provides a measurement cuvette for enumerating and/or characterising cells, particularly blood cells, the measurement cuvette comprising a base and a transparent lateral enclosure extending from the base so as to form therewith an optical measurement chamber; the base having a through-orifice of 30 to 100 µm in diameter for cells to pass through, characterised in that the base and the transparent lateral enclosure form a one-piece cuvette suitable both for impedance measurement and for optical measurement.

By means of this one-piece measurement cuvette, it is possible to do without three of the four seals previously required for a measurement cuvette for both cell volume measurement and optical measurements. Indeed, due to its one-piece nature, the measurement cuvette no longer needs seals between the through-orifice and the optical measurement chamber and between the positive electrode and the part serving for the discharge of the various liquids (sheath liquid, Lysis, etc.). Moreover, this measurement cuvette enables a impedance measurement of volume and optical measurements on the same cell at intervals of a few microseconds.

Further optional and non-limiting features are described hereinafter.

The base may have an upper surface which is the combination of a lateral surface and a surface of lesser radius of a frustum, the through-orifice traversing the base at a portion thereof corresponding to the surface of lesser radius of the upper surface.

The base may have a lower surface which is the combination of a lateral surface and a surface of lesser radius of a frustum, the through-orifice traversing the base at a portion thereof corresponding to the surface of lesser radius of the lower surface.

The base may have, at the portion corresponding to the surface of lesser radius, a thickness between 40 and 100 µm.

The cuvette may further comprise a fluid intake with an intake orifice opening into the measurement chamber, the intake orifice being lower than the through-orifice.

The enclosure may have a spherical outer surface, the centre whereof is at the exit and in the vicinity of the through-orifice. The centre of the spherical outer surface may be located between 200 and 600 µm from the exit of the through-orifice.

The cuvette may further comprise a seal housing on an upper surface of the enclosure.

The cuvette may further comprise a sub-base under the base, the sub-base forming with the base and the enclosure the one-piece cuvette; wherein the sub-base has a lateral surface comprising V-shaped centring elements.

The present invention also provides a system for characterising cells, particularly blood cells, comprising the measurement cuvette as described above and a cuvette support. The cuvette support may have two grooves intersecting at an intersection and wherein the transversal profile is a V, the intersection forming a seat for the measurement cuvette.

BRIEF DESCRIPTION OF THE DRAWINGS

Further aims, features and advantages will become apparent from reading the following description given by way of illustration and not limitation with reference to the appended drawings, wherein.

DETAILED DESCRIPTION

Throughout the present disclosure, spatial terms are determined in relation to the measurement cuvette in its normal operational position.

Measurement Cuvette.

A measurement cuvette 1 for enumerating and/or characterising cells according to the present invention will be described hereinafter with reference to FIGS. 1 to 4.

Figure 1:
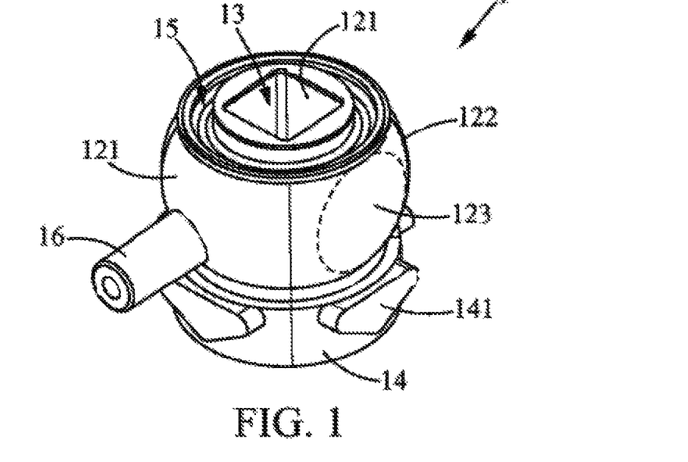
FIG. 1 is a three-quarter view of a measurement cuvette according to the invention.
Figure 2:
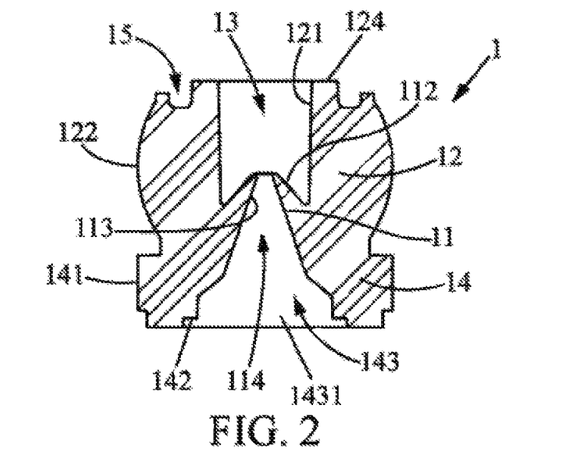
FIG. 2 is a sectional view along plane P of the measurement cuvette of FIG. 1.

The measurement cuvette 1 comprises a base 11 and a transparent lateral enclosure 12 extending from the base 11 so as to form therewith an optical measurement chamber 13; the base having a through-orifice 111 of 30 to 100 µm in diameter for cells to pass through. The base 11 and the enclosure 12 form a one-piece cuvette suitable both for impedance measurement and for optical measurement.

Figure 3:
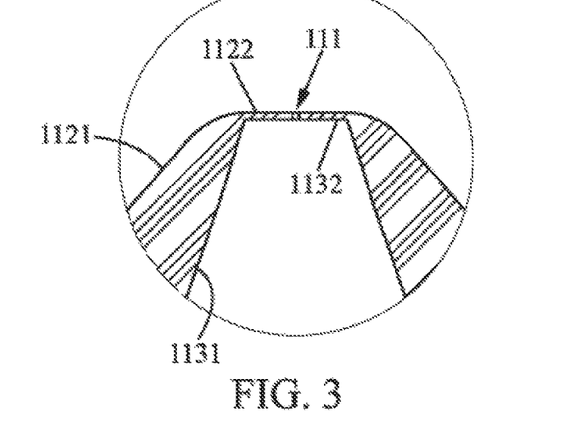
FIG. 3 is an enlarged view of the through-orifice illustrated in FIG. 2.

The through-orifice 111 advantageously has a mean diameter of 40 to 80 µm, or of 50 to 60 µm. The through-orifice 111 is advantageously cylindrical with a circular base. This latter shape has the advantage of not disturbing the measurements. Indeed, the orifices obtained by micro-machining using a commercial laser have a natural conicity due to the Gaussian energy profile of the beam emitted by the laser. Yet a tapered orifice modifies, sometimes considerably, the shape of the pulses created by a cell when the cell passes through the tapered orifice by particularly modifying the pulse width.

The base 11 may moreover have an upper surface 112 which is the combination of a lateral surface 1121 and of a surface of lesser radius 1122 of a frustum, preferably of a frustum of revolution, also known as a right circular cone. The corresponding cone vertex angle is preferentially between 20° and 60°. The lesser radius may be between 0.5 and 1.5 mm, preferably about 1 mm. The through-orifice 111 then extends through the base 11 at a portion thereof corresponding to the surface of lesser radius 1122 of the upper surface 112. Thus, the upper surface 112 of the base 11 penetrates the optical measurement chamber 13. The penetration of the upper surface 112 of the base 11 into the optical measurement chamber 13 enables the measurements to be carried out in an open space unlike cuvettes wherein the measurements are made in a confined space corresponding to the cross-section of the through-orifice. Carrying out measurements in an open space has the advantage of facilitating cleaning of the measurement zone by rinsing. The slope of the frustum enables adaptation to the optical aperture while bringing the exit of the through-orifice 111 as closely as possible to a focus point of the light rays emitted by an excitation source (see below).

Additionally or alternatively, the base 11 may moreover have a lower surface 113 which is the combination of a lateral surface 1131 and a surface of lesser radius 1132 of a frustum, preferably of a frustum of revolution. The corresponding cone vertex angle is preferentially between 20° and 60°. The through-orifice 111 in this case then extends through the base 11 at a portion thereof corresponding to the surface of lesser radius 1131 of the lower surface 113. Thus, the lower surface 113 of the base 11 defines a convergent chamber 114 from an input represented by the base of greater radius of the frustum up to the through-orifice 111. Such a configuration enables the sheathing of a sample flow containing cells to be enumerated and/or characterised and directed centrally towards the through-orifice 111 by a sheath flow injected laterally towards the surface of lesser radius 1132 thus ensuring precise hydrodynamic centring of the sample jet. This configuration is known as "hydrofocussing".

When the base 11 has both an upper surface 112 and a lower surface 113 as described above, these are centred in relation to one another such that the input of the through-orifice 111 on the lower surface 113 and the exit of the through-orifice 111 on the upper surface 112 are situated on their common longitudinal axis.

Preferably, the base 11 has, in the vicinity of the through-orifice 111, a thickness between 40 and 100 µm, particularly at the portion corresponding to the surfaces of lesser radius 1122, 1132 of the upper surface 112 and lower surface 113 thereof. Advantageously, this thickness is between 50 and 80 µm, between 55 and 70 µm, or is about 60 µm.

The enclosure 12 may have an inner surface 121, the shape whereof is that of the lateral surface of a square-based right cylinder. The side of the square forming the base of the lateral surface is preferentially chosen between 3 and 7 mm, or between 4 and 6 mm, or between 4.5 and 5.5 mm, preferentially about 5 mm. Further shapes for the base may be chosen, such as circular, triangular, etc. Preferably, the shape of the base is a regular geometric figure, i.e. having at least one element of symmetry, preferably a centre of symmetry or an axis of symmetry.

Additionally or alternatively, the enclosure 12 has a spherical outer surface 122 wherein the centre of the corresponding sphere is situated at the exit and in the vicinity of the through-orifice 111.

The combination of a spherical outer surface 122 and of a square-based right cylindrical inner surface 121 forms three or four converging lenses 123, each corresponding to a face of the inner surface 121 and the focal point whereof is the centre of the sphere corresponding to the spherical outer surface 122. Thus, the measurement cuvette 1 incorporates these lenses in its structure which helps lower the total cost of the measurement system by exempting the user from having have at his or her disposal converging lenses between the measurement cuvette, on one hand, and the excitation sources and the sensors, on the other, and from having to carry out corresponding adjustments. Moreover, such a structure significantly reduces the spherical aberration of the measurement system, guaranteeing maximum power at the measurement point. Furthermore, a numerical aperture of the order of 0.5 may be obtained without using lens, unlike commercial devices.

Moreover, the arrangement of the focal point of the lenses 123 at the exit and in the vicinity of the through-orifice 111 enables optical measurements on the cell when it has just come out of the through-orifice 111 and the centring of the sample flow is optimal. Indeed, the further one moves away from the exit of the through-orifice, the more uncertain the position of the cell is and the greater the risk of it being off-centre in relation to the sample jet.

Thus, the centre of the spherical outer surface 122 is preferably located between 200 and 600 µm, or 300 and 500 µm, or 350 and 450 µm, preferably at about 400 µm, from the exit of the through-orifice 111 in the direction of the sample flow, particularly parallel with the longitudinal axis of the upper surface 112 and the lower surface 113 of the base 11 when these correspond to combinations of lateral surfaces and surfaces of lesser radius of a frustum of revolution.

Moreover, the enclosure 12 may comprise on an upper surface 124 thereof a seal housing 15 for receiving a seal, preferentially an O-ring.

The measurement cuvette 11 may further comprise a fluid intake 16 having an intake orifice opening into the measurement chamber 13. The intake orifice is disposed lower than the through-orifice 111. This fluid intake enables a second sheathing of the sample flow at the exit of the through-orifice 111. Furthermore, this fluid intake makes it possible to prevent formation of recirculation volume by sweeping across the area, preventing a cell outflowing from the sample jet downstream and at a distance from the exit of the through-orifice 111 where the sheath is less effective, from recirculating in a loop and thus impeding the optical measurements made on the subsequent cells. Moreover, the combination between the fluid intake 16 and an upper surface 112 of the base 11 corresponding to the combination of the lateral surface 1121 and surface of lesser radius 1122 of a frustum has the advantage of guiding the second sheath fluid towards the exit of the through-orifice 111.

The measurement cuvette 1 may further comprise a sub-base 14 under the base 11. The sub-base 14 forms with the base 11 and the enclosure 12 the one-piece cuvette. The sub-base 14 has a hole 143 which opens onto the converging chamber 114. On the outer side 1431 of the hole, a shoulder 142 may be provided for receiving an O-ring.

The diameter of the hole 143 on its outer side 1431 may be greater than the diameter of the circle forming the base of the frustum of the lower surface 113 of the base 11, for example it may be between 400 and 700 µm, between 450 and 650 µm, between 500 and 600 µm, preferably about 550 µm. The diameter of the hole 143 then decreases progressively until it equals that of the circle forming the base of the frustum of the lower surface 113 of the base 11.

Figure 5:
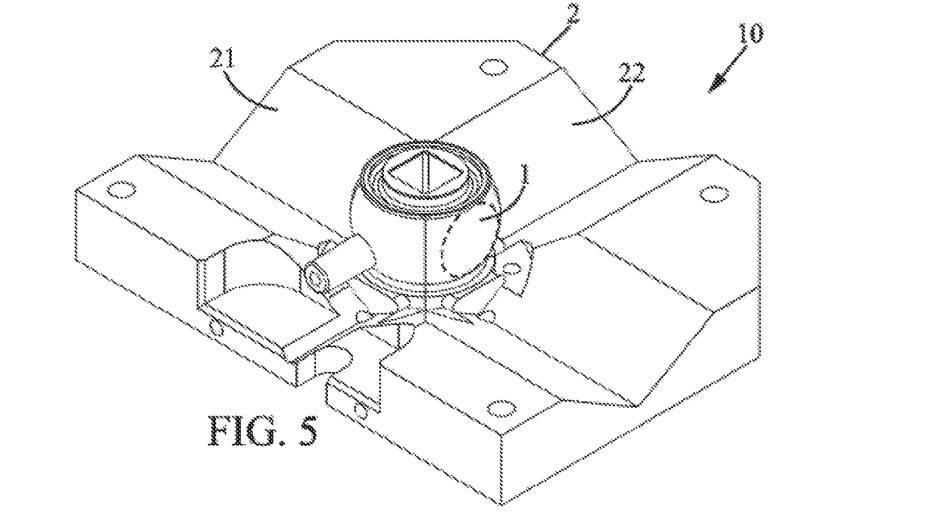
FIG. 5 is a three-quarter view of the measurement cuvette of FIG. 1 on its cuvette support.

Moreover, the sub-base 14 has a lateral surface comprising V-shaped centring elements 141. These V-shaped centring elements 141 engage with grooves of a cuvette support described hereinafter. Preferably, the lateral surface of the sub-base comprises two V-shaped centring elements 141 the mean planes whereof intersect each other, preferably perpendicularly. Advantageously, the lateral surface of the sub-base comprises two pairs of V-shaped centring elements 141. The mean planes of two V-shaped centring elements of the same pair are parallel while the mean planes of two V-shaped centring elements of different pairs intersect each other, preferably perpendicularly. Advantageously, the mean planes of a pair of V-shaped centring elements 141 are parallel with two opposite faces of the square-based right cylindrical inner surface 121.

These V-shaped centring elements 141 are protruding elements wherein the tip of the V is facing downwards, i.e. in the direction oriented from the enclosure towards the sub-base. Preferably, the tip of the V is planed down. Planing down the tip of the V makes it possible to prevent poor positioning of the measurement cuvette 1 due to a potential burr on the tip during the manufacture of the measurement cuvette 1.

Advantageously, the one-piece cuvette preferably has a refractive index between 1.4 and 1.6. Moreover, plastic is preferentially chosen so as to have a transmission of the operating wavelength greater than 90%, preferably of low birefringence and of low heat distortion.

Moreover, the material of the one-piece cuvette is advantageously chosen so as to have a low water absorption resistance (for example less than 0.01%). Furthermore, the material preferably has a low dielectric constant (for example at most 3 F/m) at frequencies less than 3 MHz, or less than 1 MHz, in order to ensure satisfactory electrical insulation between the electrodes on either side of the through-orifice.

The material of the one-piece cuvette is advantageously plastic. Thus, the one-piece cuvette is obtained by moulding making it possible to drastically reduce the cost of the measurement cuvette in comparison with the measurement cuvettes of the prior art. The material of the one-piece cuvette may comprise essentially a polycycloolefin resin, particularly more than 95% by weight of this resin, or more than 99.5% by weight of this resin. An example of such a resin is Zeonex E48R (2015) from Zeon®. Such a resin is very liquid in molten form suitable for being injected at a very high pressure with a very low tube sinking and suitable for controlling precisely the dimensions of the one-piece cuvette and a surface roughness of optical quality.

Measurement System.

Figure 6:
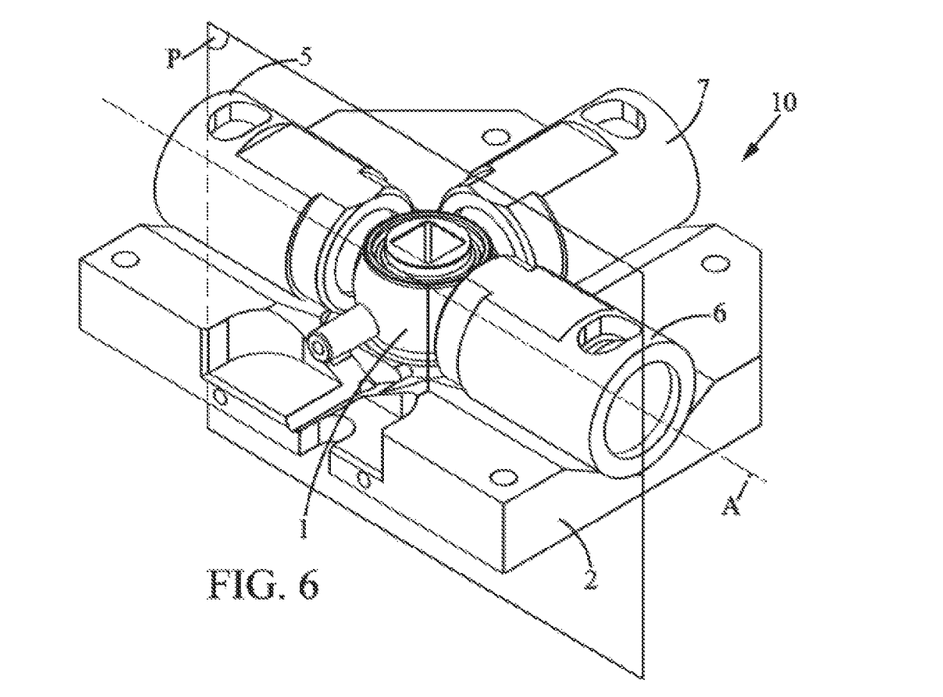
FIG. 6 is a three-quarter view of a measurement system comprising the measurement cuvette and the cuvette support of FIG. 5 as well as the various optics required for the optical measurements.
Figure 7:
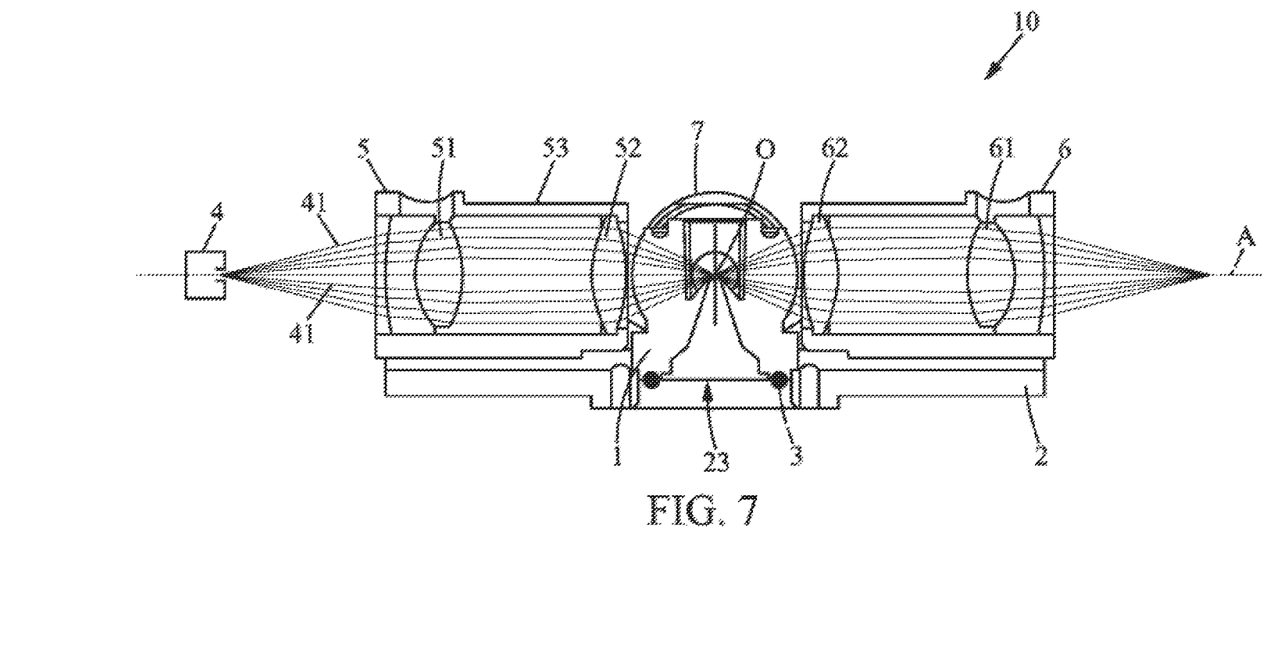
FIG. 7 is a sectional view along plane P shown in FIG. 6 and passing through the optical centre of the measurement system.

A measurement system for enumerating and/or characterising cells according to the invention is described hereinafter with reference to FIGS. 5 to 7.

The measurement system 10 comprises the measurement tank 1 as described above.

Furthermore, the measurement system 10 comprises a cuvette support 2 for receiving the measurement cuvette 1 and securing same during the measurements. The cuvette support 2 may advantageously have, when the measurement cuvette 1 has V-shaped centring elements 141, two grooves 21, 22 intersecting each other, preferably perpendicularly, at an intersection and wherein the transversal profile is a V corresponding to the shape of the V-shaped centring elements 141 of the measurement cuvette 1. The intersection forms a seat for the measurement cuvette 1. The angle of intersection between the two grooves 21, 22 corresponds to the angle of intersection of the mean planes of the V-shaped centring elements 141.

Moreover, the cuvette support 2 has at the intersection an orifice 23 for receiving the sheath jet and the sample jet. This orifice 23 is suitable for being in fluidic communication with the converging chamber 114 when the measurement cuvette 1 is placed on the cuvette support 2. Furthermore, the measurement system 10 may comprise an O-ring 3 to be disposed between the measurement cuvette 1 and the cuvette support 2.

The measurement system 10 may further comprise an impedance measurement assembly including a positive electrode and a negative electrode for the impedance measurement.

The measurement system 10 may further comprise an optical measurement assembly including an excitation source 4 for emitting a light towards the measurement cuvette 1. An optical axis A is defined from the excitation source 4 as the mean direction of the light rays 41 emitted thereby. The arrangement of the excitation source 4 is chosen such that the optical axis A passes through the centre O of the spherical outer surface 122 of the enclosure 12 when the measurement cuvette 1 is in place.

The excitation source 4 is preferably an incoherent source. Thus, the shaping of the light rays 41 is facilitated and at least cost compared with prior systems requiring lasers. Indeed, the sample flow has a width of a few micrometres. The cell of diameter less than the width of the sample flow may be situated anywhere along this width. The use of a low-coherence excitation source 4 enables the formation of a homogeneously illuminated zone at the measurement point, which is the centre O of the spherical outer surface 122 of the enclosure 12, comprising the width of the sample flow. Thus, the optical signal arriving at the sensor will be the same regardless of the position of the cell in the sample flow.

The excitation source 4 may be chosen from: a light-emitting diode and incandescent bulb. The excitation source has an emission spectrum centred on a wavelength between 620 and 680 nm, 635 and 665 nm, advantageously about 650 nm.

The optical measurement assembly may further comprise input shaping optics 5 on the optical axis A. These input shaping optics 5 are to be disposed between the excitation source 4 and the measurement cuvette 1. The shaping optics 5 make it possible to convert the light rays 41 emitted radially with respect to the excitation source 4 and arriving on the first shaping optics 5 in light rays parallel with the optical axis A. For this, it comprises a first optical group 51 acting as a converging lens. In order to improve the focus of the light rays at the centre O of the spherical outer surface 122 of the enclosure 12, a second optical group 52 acting as a converging lens may also be provided in order to carry out a first convergence of the light rays towards the centre O of the spherical outer surface 122 of the enclosure 12. The combination of the second optical group 52 and the converging lenses 123 of the cuvette 1 makes it possible to ensure both a minimal spherical aberration at the centre O of the spherical outer surface 122 of the enclosure 12, maximum power at this point O and a maximum numerical aperture. The integration of a lens 123 in the measurement cuvette 1 helps save on costs; without this lens 123, it would have been necessary to integrate same in the shaping optics. The first optic group 51, and if applicable also the second optic group 52, is preferably contained in a casing 53 of general cylindrical shape with a circular base for facilitated height and angular positioning on the groove 21 of the cuvette support 2.

The input shaping optics 5 are also suitable for forming the image of a reticle in the vicinity of the exit of the through-orifice 111 when the measurement cuvette 1 is in place. If applicable, the image of the reticle is formed on a plane comprising the centre O of the spherical outer surface 122 of the enclosure 12. To this aim, the optical measurement assembly further comprises a rectangular reticle between the excitation source 41 and the input shaping optics 5. Preferably, the aspect factor (ratio of length over width) is less than or equal to 3. The input shaping optics are suitable for example for forming a rectangular reticle about 100 μm in length and approximately 30 μm in width.

Preferably, the input shaping optics 5 are adapted so that the converging light rays 41 form a large solid angle, for example between 30° and 50°. Thanks to this large aperture made possible particularly by the frustum shape of the upper surface 112 of the base of the measurement cuvette 1, it is possible to collect maximum light at the output.

The optical measurement assembly may comprise an absorbance measurement module including a sensor suitable for measuring the absorbance of the cell and first output receiving optics 6 so as to converge the light rays passing through the measurement cuvette 1 and arriving on the first receiving optics 6 towards the sensor. Preferably, the sensor and the first receiving optics 6 are disposed on the optical axis A on the opposite side of the excitation source 41 in relation to the measurement cuvette 1, the first receiving optics 6 are to be disposed between the measurement cuvette 1 and the sensor. In some cases, the sensor and the first receiving optics 6 may be disposed outside the optical axis A, in which case a baffle is disposed on the optical axis A and one the path of the light rays 41 between the measurement cuvette 1 and the first receiving optics 6. The sensor is preferentially a photodiode.

Although not necessary, preferably, the first receiving optics 6 have the same aperture as the input shaping optics 5 in order to minimise costs through symmetrising the system.

The optical measurement assembly may comprise a scatter measurement module including a sensor suitable for measuring the side scatter of the cell and second output receiving optics 7 in order to converge the light rays 41 scattered by the cuvette and arriving on the second receiving optics 7, towards the sensor. Preferably, the sensor and the second receiving optics 7 are disposed on an axis perpendicular to the optical axis A, parallel with the cuvette support and passing through the centre O of the spherical outer surface 122 of the enclosure 12 when the measurement cuvette 1 is in place. In some cases, the sensor and the second receiving optics 7 may be disposed outside the perpendicular axis to the optical axis, in which case a baffle is disposed on the axis perpendicular to the optical axis A and on the path of the light rays 41 between the measurement cuvette 1 and the second receiving optics 7. The sensor is preferentially an avalanche photodiode.

The optical measurement assembly may comprise a fluorescence measurement module including a sensor suitable for measuring the fluorescence of the cell and third output receiving optics (not shown) in order to converge the light rays scattered by the cuvette and arriving on the third receiving optics, towards the sensor. Preferably, the sensor and the third receiving optics are disposed on a axis perpendicular to the optical axis, parallel with the cuvette support and passing through the centre of the spherical outer surface of the enclosure when the measurement cuvette is in place. In some cases, the sensor and the third receiving optics may be disposed outside the axis perpendicular to the optical axis, in which case a baffle is disposed on the perpendicular axis to the optical axis and on the path of the light rays between the cuvette support and the third receiving optics. The sensor is preferentially an avalanche photodiode.

In the case where the optical measurement assembly comprises both a side scatter measurement module and a fluorescence measurement module, one may be on the axis perpendicular to the optical axis and the other outside. In this case, the corresponding baffle is a dichroic mirror.

Alternatively, the two modules may be outside the axis perpendicular to the optical axis. In this case, the baffle closest to the cuvette support is a dichroic mirror. The farthest baffle may be either a semi-reflective mirror or a true mirror.

Also alternatively, a dichroic mirror may be added to the side scatter measurement module to enable the measurement of one or a plurality of fluorescences while using the same components of the measurement system 10. The dichroic mirror is disposed between the cuvette support and the second receiving optics. Moreover, dichroic optical filters may be provided to separate the optical fluorescence signals of different wavelengths, generally in mid-height width spectra of 20 to 50 nm, or 30 to 40 nm. In this case, they are disposed between the dichroic mirror and the fluorescence sensor.

Throughout the present disclosure, the terms "shaping optics" and "receiving optics" should be understood as denoting a lens or a set of lenses for changing the direction of the light rays. Preferably, all the shaping and receiving optics are identical. That is to say they all comprise a first optical group and a second optical group; the latter to be disposed closer to the measurement cuvette 1 than the first optical group.

Preferably, each of the receiving optics 6, 7 have a casing of cylindrical shape with a circular base, like the shaping optics 5, for the height and angular positioning thereof on the cuvette support 2. V-shaped centring elements may be envisaged to engage with corresponding grooves 21, 22 of the cuvette support 2, which may be the same as those used for the positioning of the measurement cuvette 1.

The measurement cuvette 1 and/or the cuvette support 2 are advantageously adapted so that a face of the square-based right cylindrical inner surface of the enclosure is normal to the optical axis. In this case, the shaping optics are disposed either on the optical axis, or on an axis perpendicular thereto and passing through the centre of the spherical outer surface of the enclosure when the measurement cuvette is in place.

Method for Manufacturing the Measurement Cuvette.

Figure 8:
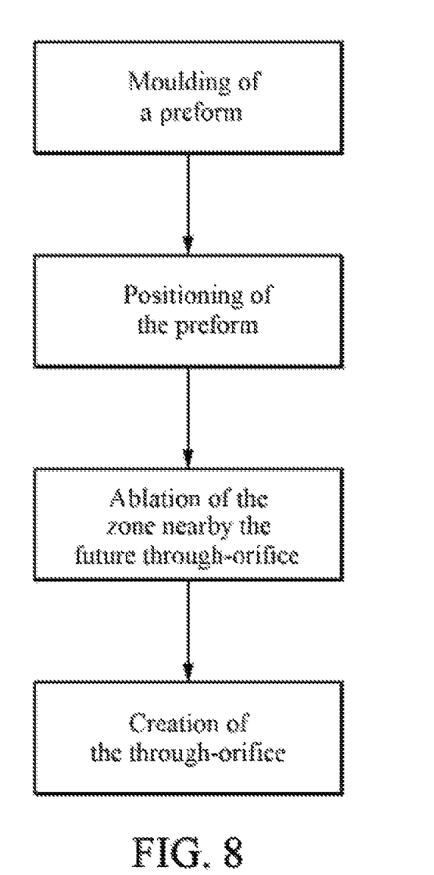
FIG. 8 is a chart showing the steps of a method for producing the measurement cuvette of FIG. 1.

A method for manufacturing the measurement cuvette is described hereinafter with reference to FIGS. 2, 4 and 8.

Figure 4:
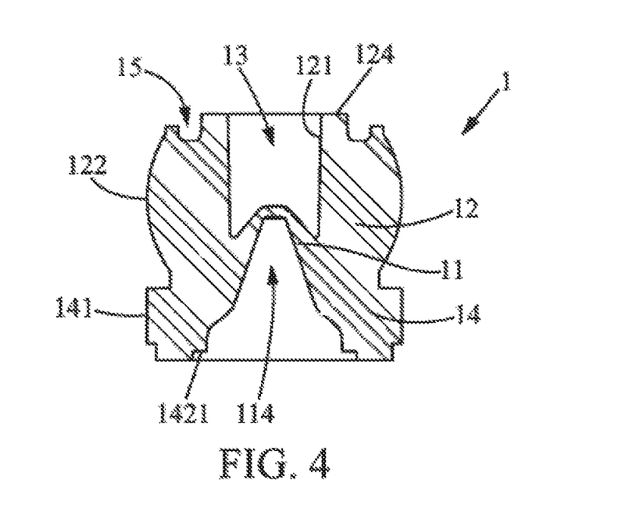
FIG. 4 is a sectional view along plane P of a preform leading to the measurement cuvette in FIG. 2.

The method comprises moulding a preform, the form whereof is generally that of the measurement cuvette with the exception of the base (see FIG. 4). Notably, the through-orifice is not yet formed and the thickness of the zone of the base near the first through-orifice has not yet reached the desired thinness. The nearby thickness is between 400 and 600 μm, or between 450 and 550 μm, or 475 and 525 μm, preferably about 500 μm.

The method also comprises ablating the zone of the base near the future through-orifice over a sufficient depth so as to leave a thickness between 40 and 100 μm, between 50 and 80 μm, between 55 and 70 μm, or about 60 μm, ablating being carried out using ultrashort pulses. Advantageously, ablating the zone of the base near the future through-orifice is carried out using a laser, the beam whereof is preferably directed to the lower surface of the base. Preferably, ablating results in an ablation circle of diameter between 0.6 and 1.4 mm. Control of the thickness of this area (which is the thickness near the through-orifice) is important from a dimensional point of view in order to ensure a qualitative resistivity measurement. Indeed, the thickness of the through-orifice is directly linked to the widths of the pulses created by a cell when said cell passes through the through-orifice. If the thickness is excessive and uncontrolled, there is a risk of a plurality of cells passing through the through-orifice at the same time and therefore generating a measurement artefact on the linearities.

The method then comprises forming the through-orifice with laser micromachining, for example according to the method described in WO 2017/029210, making it possible to obtain a perfectly cylindrical orifice for the impedance measurement.

The method may optionally comprise positioning the preform on a positioning tool between moulding and ablating steps, thus making it possible to secure the preform during ablating and forming the through-orifice ablation. The positioning tool may particularly comprise a positioning support having on its upper surface a recess, the shape whereof is complementary to that of the cuvette.

The invention claimed is:

1. A measurement cuvette comprising a base and a transparent lateral enclosure extending from the base so as to form therewith an optical measurement chamber; the base having a through-orifice of 30 μm to 100 μm in diameter for cells to pass through, wherein the base and the transparent lateral enclosure form a one-piece cuvette suitable both for impedance measurement and for optical measurement, wherein the base has an upper surface that penetrates inside the optical measurement chamber as a frustoconical shape having a first end of a greater radius positioned proximate to where the transparent lateral enclosure extends from the base, a second end of a lesser radius comprising a surface, and between the first end to the second end extends a lateral surface, wherein the upper surface is formed by the combination of the lateral surface and the surface of the lesser radius, and the through-orifice traversing the base at a portion thereof of the surface of lesser radius of the upper surface.

2. The measurement cuvette according to claim 1, wherein the base has a lower surface, and a thickness defined between the lower surface and the upper surface, the lower surface defining a convergent chamber having a frustoconical shape comprising a first end having a greater radius as an inlet of the convergent chamber, a second end having a lesser radius as a surface of a lesser radius of the convergent chamber and extending between the first end and the second end a lateral surface of the convergent chamber, wherein the lower surface is formed from the combination of the lateral surface of the convergent chamber and the surface of the lesser radius of the convergent chamber, and the through-orifice traversing the base at a portion thereof traverses the thickness and the surface of the lesser radius of the lower surface.

3. The measurement cuvette according to claim 1, wherein the base has, at the portion corresponding to the surface of lesser radius, a thickness between 40 μm and 100 μm.

4. The measurement cuvette according to claim 1, further comprising a fluid intake having an intake orifice opening into the measurement chamber, the intake orifice being lower than the through-orifice.

5. The measurement cuvette according to claim 1, wherein the enclosure has a spherical outer surface, the centre whereof is at the exit and in the vicinity of the through-orifice.

6. The measurement cuvette according to claim 5, wherein the centre of the spherical outer surface is situated between 200 μm and 600 μm from the exit of the through-orifice.

7. The measurement cuvette according to claim 1, further comprising a seal housing on an upper surface of the enclosure.

8. The measurement cuvette according to claim 1, further comprising a sub-base under the base, the sub-base forming with the base and the enclosure the one-piece cuvette; wherein the sub-base has a lateral surface comprising V-shaped centering elements.

9. A system for characterising cells, comprising the measurement cuvette according to claim 1 and a cuvette support.

10. The system according to claim 9, wherein the measurement cuvette further comprises a sub-base under the base, the sub-base forming with the base and the enclosure the one-piece cuvette; wherein the sub-base has a lateral surface comprising V-shaped centering elements, wherein the cuvette support has two grooves intersecting at an intersection and wherein the transversal profile is a V, the intersection forming a seat for the measurement cuvette.

11. The measurement cuvette according to claim 2, wherein the thickness of the base between the surface of the lesser radius of the upper surface and the surface of the lower surface is between 40 μm and 100 μm.

12. The system according to claim 9, further comprising an excitation source for emitting a light towards the measurement cuvette.

* * * * *